(12) United States Patent
Holverson et al.

(10) Patent No.: US 11,042,226 B2
(45) Date of Patent: Jun. 22, 2021

(54) CONSTELLATION-BASED AUGMENTATION OF MOUSE FORM-FACTOR FOR VIRTUAL REALITY APPLICATIONS

(71) Applicant: Microsoft Technology Licensing, LLC, Redmond, WA (US)

(72) Inventors: Erik Alan Holverson, Redmond, WA (US); Yijie Wang, Bellevue, WA (US); Alexandru Octavian Balan, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 22 days.

(21) Appl. No.: 16/059,849

(22) Filed: Aug. 9, 2018

(65) Prior Publication Data
US 2019/0302898 A1   Oct. 3, 2019

Related U.S. Application Data

(60) Provisional application No. 62/651,471, filed on Apr. 2, 2018.

(51) Int. Cl.
*G06F 3/03* (2006.01)
*G06F 3/01* (2006.01)
(Continued)

(52) U.S. Cl.
CPC ............. *G06F 3/03* (2013.01); *G02B 27/017* (2013.01); *G02B 27/0172* (2013.01); *G06F 3/011* (2013.01); *G06F 3/0304* (2013.01); *G06F 3/0308* (2013.01); *G06F 3/0325* (2013.01); *G06T 15/20* (2013.01); *G06T 19/006* (2013.01);
(Continued)

(58) Field of Classification Search
CPC .......... G06F 3/011; G06F 3/012; G06F 3/005; G06F 3/04815; G06F 3/016; G06F 3/0325; G06F 3/03543; G06F 3/0346; G06F 3/0304; G06F 3/0308; G06F 3/038; G06F 3/03541; G06F 3/033; G06F 3/03; G02B 2027/0138; G02B 2027/0134;
(Continued)

(56) References Cited

U.S. PATENT DOCUMENTS 6,417,836 B1 * 7/2002 Kumar ................... G06F 3/0325
345/156
7,965,304 B2 * 6/2011 Sakagawa ............... B33Y 50/00
345/633

(Continued)

*Primary Examiner* — Dismery Mercedes
(74) *Attorney, Agent, or Firm* — Arent Fox, LLP (57) ABSTRACT

Techniques that modify traditional input devices (e.g., traditional computer mouse form factor) to interact with the virtual reality (VR) devices are described. Such modification allows the VR devices the ability to track the position and orientation of the mouse in the 3 dimensional (3D) VR without requiring extensive complex hardware typically included in VR motion controllers. Specifically, the traditional mouse form factor may be merged with 3D constellation based tracking elements (e.g., LEDs) with minimal form-factor modifications. The constellation tracking elements may include a plurality of fiducial markers on the mouse that may be detected by an imaging sensor, and thus allow tracking with a single imaging sensor (e.g., either head-mounted or fixed position).

17 Claims, 8 Drawing Sheets

(51) Int. Cl.
   *G02B 27/01* (2006.01)
   *G06T 19/00* (2011.01)
   *G06T 15/20* (2011.01)

(52) U.S. Cl.
   CPC ............... *G02B 2027/014* (2013.01); *G02B 2027/0138* (2013.01); *G06T 2215/16* (2013.01)

(58) Field of Classification Search
   CPC ..... G02B 27/017; G06T 19/00; G06T 19/006; G06T 7/70; G06T 17/00; G06T 2207/30204
   See application file for complete search history.

(56) References Cited

U.S. PATENT DOCUMENTS

| | | | |
|---|---|---|---|
| 8,221,229 B2 * | 7/2012 | Mikhailov | A63F 13/06 |
| | | | 463/25 |
| 9,354,718 B2 * | 5/2016 | Vesely | H04N 13/366 |
| 10,010,788 B2 * | 7/2018 | Huang | G06F 3/011 |
| 10,254,546 B2 * | 4/2019 | Poulos | G06F 3/0304 |
| 10,504,231 B2 * | 12/2019 | Fiala | A63F 13/25 |
| 2010/0303291 A1 * | 12/2010 | Margolis | G06K 9/00369 |
| | | | 382/103 |
| 2014/0160037 A1 * | 6/2014 | Soelberg | G06F 3/0488 |
| | | | 345/173 |
| 2015/0049021 A1 * | 2/2015 | Cheng | G06F 3/03543 |
| | | | 345/163 |
| 2016/0140764 A1 * | 5/2016 | Bickerstaff | G06F 3/0346 |
| | | | 345/633 |
| 2016/0260251 A1 * | 9/2016 | Stafford | G02B 27/0101 |
| 2016/0357261 A1 * | 12/2016 | Bristol | A63F 13/24 |
| 2016/0364910 A1 * | 12/2016 | Higgins | A63F 9/24 |
| 2017/0352184 A1 * | 12/2017 | Poulos | G02B 27/0172 |
| 2018/0039341 A1 * | 2/2018 | Du Bois | G06F 3/04815 |
| 2018/0181194 A1 * | 6/2018 | Harvey | G06F 3/011 |
| 2018/0284982 A1 * | 10/2018 | Veeramani | G06F 3/011 |
| 2018/0314416 A1 * | 11/2018 | Powderly | G06F 3/016 |
| 2018/0329517 A1 * | 11/2018 | Steedly | G06T 7/85 |
| 2019/0113966 A1 * | 4/2019 | Connellan | G01S 5/16 |
| 2019/0272048 A1 * | 9/2019 | Lin | G06F 3/0383 |
| 2019/0295323 A1 * | 9/2019 | Gutierrez | G06F 3/04815 |

* cited by examiner

CONSTELLATION-BASED AUGMENTATION OF MOUSE FORM-FACTOR FOR VIRTUAL REALITY APPLICATIONS

CROSS-REFERENCE TO RELATED APPLICATION(S)

This application claims benefit of U.S. Provisional Application Ser. No. 62/651,471, entitled "CONSTELLATION-BASED AUGMENTATION OF MOUSE FORM-FACTOR FOR VIRTUAL REALITY APPLICATIONS" and filed Apr. 2, 2018, which is expressly incorporated by reference herein in its entirety.

BACKGROUND

The present disclosure relates to computer graphics systems, and more particularly, to devices and methods of leveraging traditional input devices (e.g., mouse) for use in virtual reality applications.

Use of computing devices is becoming more ubiquitous by the day. Computing devices range from standard desktop computers to wearable computing technology and beyond. One area of computing devices that has grown in recent years is virtual reality (VR) devices, which rely on a graphics processing unit (GPU) to render graphics from a computing device to a display device based on rendering instructions received from the computing device. In VR devices, the image to be produced on a display device can be oriented or modified based on user input, where the input may include detecting movement of the user's head (e.g., detected movement of the VR device mounted on the user's head).

In addition to detecting movement of the user's head, VR devices may allow for the user to interact or modify the projected images by utilizing VR-dedicated motion controllers. Motion controllers are hardware accessories that allow users to take action in VR spanning a large range of motion styles because motion controllers include specialized hardware such as inertial measurement units (IMUs) that measure linear and angular motion with a triad of gyroscopes and accelerometers, in addition to distinctive visual features, in order for the motion controller to be mapped in spatial orientation within the VR. As such, the VR dedicated motion controllers incorporate complex hardware structure that is not only expensive, but also too bulky to be used in traditional desktop or laptop scenario. Stated simply, the VR dedicated motion controllers are single application accessories limited only to use in VR environment.

Thus, there is a need in the VR art for improvements for controllers that are less complex, cheaper, and based on more traditional form-factor that can be tracked in limited range of motions.

SUMMARY

The present disclosure solves the above-identified problem by implementing techniques that modify traditional input devices (e.g., traditional computer mouse form factor) to interact with the VR devices. Such modification allows the VR devices the ability to track the position and orientation of the mouse in 3 dimensional (3D) VR without requiring extensive complex hardware typically included in VR motion controllers. Specifically, the traditional mouse form factor may be merged with 3D constellation based tracking elements (e.g., LEDs) with minimal form-factor modifications. The constellation tracking elements may include a plurality of fiducial markers on the mouse that may be detected by an imaging sensor (e.g., detecting a bright point light source), and thus allow tracking with a single imaging sensor (e.g., either head-mounted or fixed position). As such, based on the detection and tracking of the mouse in the VR scene, the user may easily locate the mouse (or relocate the mouse in instances that the user moves his or her hand away from the mouse) in the VR scene in order to use the mouse as an input device for VR devices.

One example implementation relates to a method for tracking computer mouse in a virtual reality environment. The method may include detecting, by an image sensor of a head mounted display (HMD), one or more light sources from the computer mouse. The method may further include correlating the one or more light sources with a profile of the computer mouse. The method may further include determining a position and orientation of the input device based on the correlation of the one or more light sources, and rendering an image of the computer mouse on a display of the HMD within the virtual reality environment based on the position and orientation determination.

In another example, a computer device for processing an image frame is disclosed. The computer device may include a memory to store data and instructions, a processor in communication with the memory. The processor may be configured to execute instructions to detect, by an image sensor of a HMD, one or more light sources from the computer mouse. The processor may be configured to execute instructions to correlate the one or more light sources with a profile of the computer mouse. The processor may be configured to execute instructions to determine a position and orientation of the input device based on the correlation of the one or more light sources, and rendering an image of the computer mouse on a display of the HMD within the virtual reality environment based on the positional orientation determination.

Another example implementation relates to computer-readable medium storing instructions executable by a computer device for tracking a computer mouse in a virtual reality environment. The instructions may include code for detecting, by an image sensor of a HMD, one or more light sources from the computer mouse. The instructions may further include code for correlating the one or more light sources with a profile of the computer mouse. The instructions may further include code for determining a position and orientation of the input device based on the correlation of the one or more light sources, and rendering an image of the computer mouse on a display of the HMD within the virtual reality environment based on the position and orientation determination.

The above presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to computer graphics systems, and more particularly, to devices and methods of leveraging traditional input devices (e.g., mouse) for use in virtual reality applications. As used herein, the term virtual reality (VR) relates to at least partially virtual environment, and may include mixed reality (MR) (e.g., combining of at least two virtual environments).

As discussed above, existing VR systems utilize VR-dedicated motion controllers that generally include complex hardware (e.g., IMUs) to identify spatial orientation of the motion controllers in the VR environment. As such, the conventional VR dedicated motion controllers are expensive and limited in use to only VR devices. However, such VR dedicated motion controllers may not be necessarily. Indeed, productivity in VR environment may at times require the ability to use a traditional input device (e.g., traditional computer mouse) to author, develop, edit, and modify material (e.g., power point slide) in the VR environment. However, because in VR, actual reality is completely replaced by the virtual world, locating and interacting with the physical devices (e.g., traditional mouse) without any visual affordance makes use of such devices generally impractical, limits productivity, breaks immersion, and may cause poor user experience.

Features of the present disclosure addresses the above-identified problem by implementing techniques that modify traditional input devices (e.g., traditional computer mouse form factor) to interact with the VR devices. Such modification allows the HMD devices the ability to track the position and orientation of the mouse in the 3 dimensional VR without requiring extensive complex hardware generally included in VR motion controllers. Indeed, tracking a mouse in 3D allows the user to visualize the model of the mouse at physical location of the mouse within the VR.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1A:
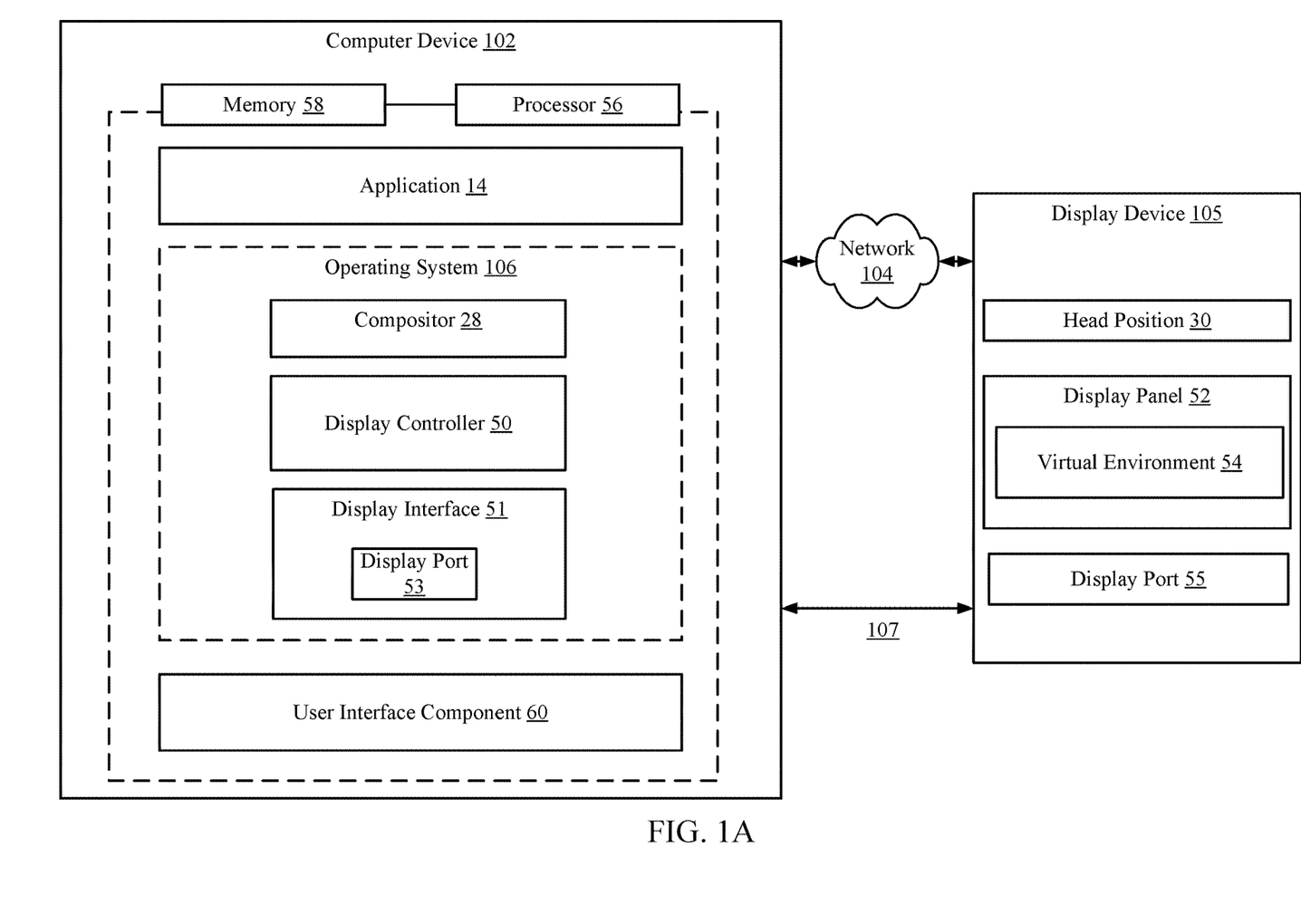
FIG. 1A is a schematic block diagram of an example computer device implementing the image processing techniques for a display device (e.g., head mounted display) in accordance with an implementation of the present disclosure.
Figure 1B:
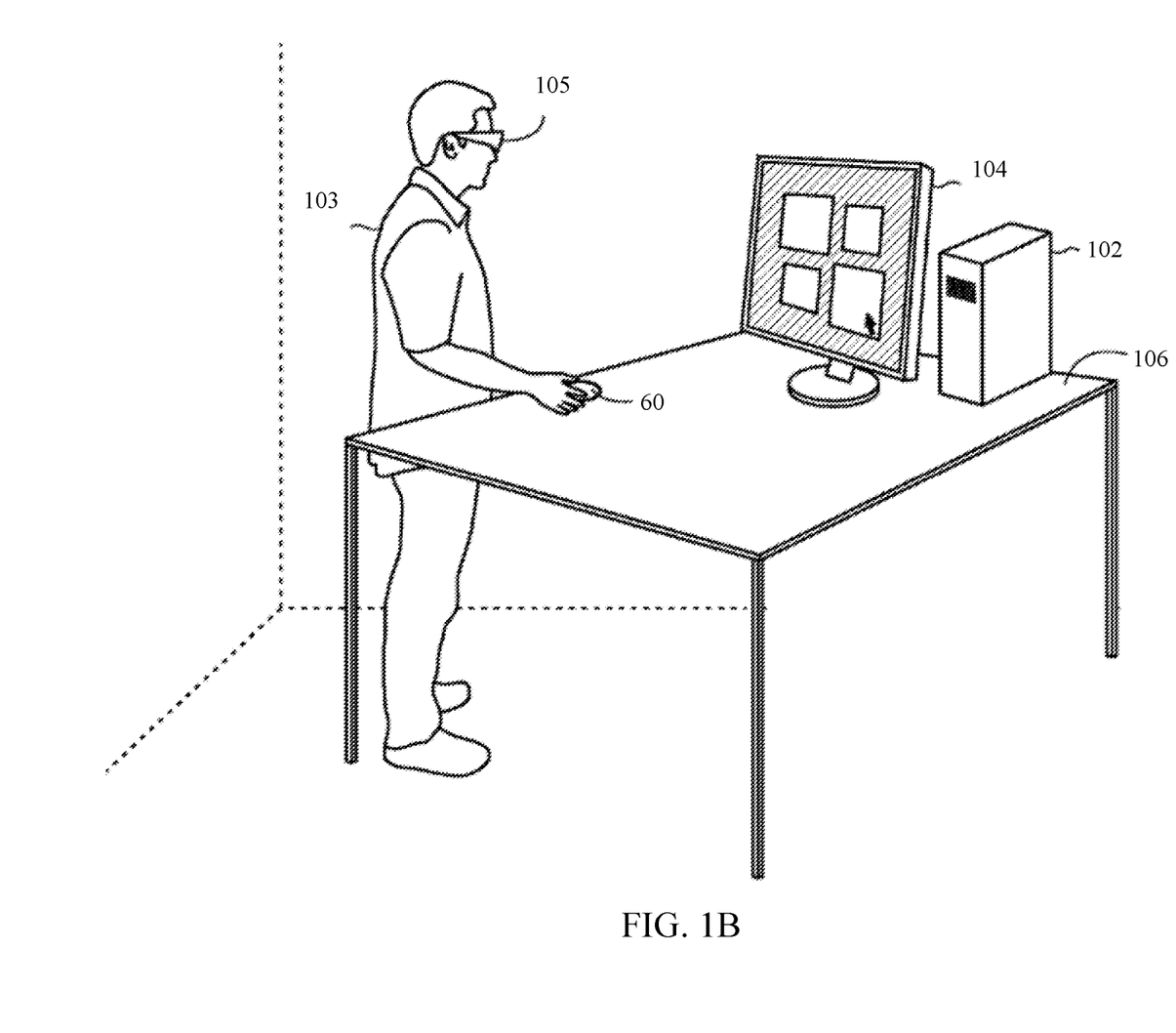
FIG. 1B is an example of a physical environment in which a user may utilize a HMD with an input device (e.g., mouse) in accordance with an implementation of the present disclosure.
Figure 1C:
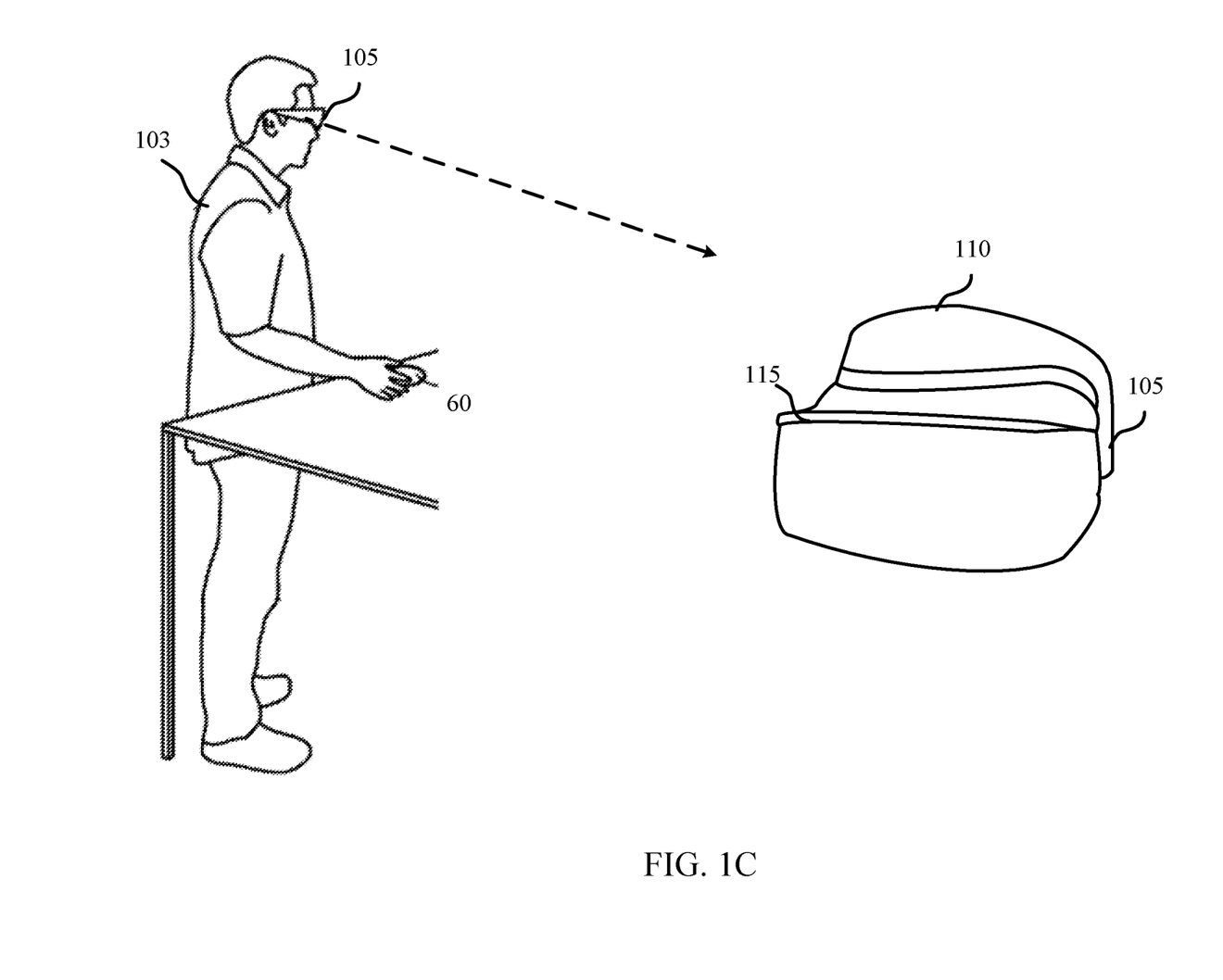
FIG. 1C is an example of the HMD in accordance with an implementation of the present disclosure.

Referring now to FIG. 1A-1C, discussed concurrently, an example system for use in connection with rendering virtual reality images may include a computer device 102 in communication with one or more display devices 105. Computer device 102 may communicate image data for displaying VR images on display device 105. Display device 105 may include, for example, a head mounted display (HMD) 105 illustrated in FIG. 1B and discussed herein contemporaneously with reference to FIG. 1A.

The HMD 105 may be configured to provide virtual reality images (e.g., from at least one virtual environment input) and/or mixed reality (MR) images (e.g., from at least two virtual environment inputs). The HMD 105 comprises a headpiece 110, which may be a headband, arranged to be worn on the head of user 103. It should be appreciated by those of ordinary skill in the art that the HMD 105 may also be attached to the user's head using a frame (in the manner of conventional spectacles), helmet, or other fit system. The purpose of the fit system is to support the display and provide stability to the display and other head-borne systems such as tracking systems, sensors, and cameras.

The HMD 105 may include a light engine (not shown), which may render images to be displayed on the optical components 115 of the HMD 105. In some examples, the light engine may comprise a light source, a micro display and imaging optics in the form of a collimating lens. The micro display can be any type of image source, such as liquid crystal on silicon (LCoS) displays, liquid crystal displays (LCD), matrix arrays of LEDs (whether organic or inorganic) and any other suitable display. The optical components 115 may focus the vision of a user on one or more portions of one or more display panels. The display panels may display one or more images (e.g., left eye image and right eye image) based on signals received from the light engine. Thus, the optics may include left eye optics for focusing the left eye of the user on the left eye image and right eye optics for focusing the right eye of the user on the right eye image. For example, the optical components 115 may focus the eyes of the user on a central portion of each of the left eye image and the right eye image. The brain of the user may combine the images viewed by each eye to create the perception that the user is viewing a 3D environment. The HMD 105 may also include a frame or slot (not shown) for coupling a smart-phone or other portable computing device to the HMD 105 in a way that exposes the display screen of the smartphone to the internal optics 115.

In FIG. 1A, a processor 56, memory 58 and other components may be integrated into and in communication with the HMD device 105 (also see FIG. 5), such as via wired or wireless communication link 107. Alternatively, such components may be housed in a separate housing connected to the HMD 105 by wired and/or wireless communication links (e.g., over network 104). For example, the components may be housed in a separate computer device 102 (e.g., smartphone, tablet, laptop or desktop computer, etc.) which communicates with the display device 105.

The computer device 102, which may be separate or part of the display device 105, may include an operating system 106 executed by processor 56 and/or memory 58 of computer device 102. Memory 58 of computer device 102 may be configured for storing data and/or computer-executable instructions defining and/or associated with operating system 106, and processor 56 may execute operating system 106. An example of memory 58 can include, but is not limited to, a type of memory usable by a computer, such as random access memory (RAM), read only memory (ROM), tapes, magnetic discs, optical discs, volatile memory, non-volatile memory, and any combination thereof. An example of processor 56 can include, but is not limited to, any processor specially programmed as described herein, including a controller, microcontroller, application specific integrated circuit (ASIC), field programmable gate array (FPGA), system on chip (SoC), or other programmable logic or state machine.

The computer device 102 may include any mobile or fixed computer device, which may be connected to a network. The computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

The computer device 102 may include one or more applications 14 that may be executed by the processor 56 to present one or more virtual reality images on the display device 105. The one or more applications 14 may include, for example, different VR applications (e.g., including MR applications) that may generate a virtual environment 54. In addition, the one or more applications 14 may provide content for the virtual environment 54. For example, an application 14 may provide a virtual game for the virtual environment 54 or provide an object that may be used within the virtual environment 54.

The operating system 106 of the computer device 102 may also include a compositor 28 for processing image data to be rendered onto the display device 105. The image data may be modified or adjusted based on user input (e.g., movement of the head position of the user when the display device 105 is a HMD). To that end, the display device 105 may capture and communicate a head position 30 of a user wearing the display device 105 to the computer device 102. The head position 30 of a user may be determined from head motion input received from HMD tracking information (e.g., a position and/or orientation of the HMD 105).

The computer device 102 may further include a user interface component 60 that may be a mouse, e.g., computer mouse, to interact with the VR environment. In some instances, the user interface component 60 may include modification that allows the VR devices the ability to track the position and orientation of the mouse in the 3D VR without requiring extensive complex hardware generally included in VR motion controllers. Indeed, tracking the mouse in 3D allows the user to visualize the model of the mouse at its physical location within the VR. Specifically, the traditional mouse form factor may be merged with 3D constellation based tracking elements (e.g., LEDs) with minimal form-factor modifications. The constellation tracking elements may include a plurality of fiducial markers on the mouse that may be detected by an imaging sensor (e.g., bright point light source), and thus allow tracking with a single imaging sensor (e.g., either head-mounted or fixed position). As such, based on the detection and tracking of the mouse in the VR scene, the user may more easily locate the mouse (or relocate the mouse in instances that the user moves his or her hand away from the mouse) in the VR scene in order to use the mouse as an input device for VR devices.

A compositor 28 may communicate with display controller 50 to transmit the image data for presentation on the downstream consumers. In an implementation, display controller 50 may communicate with a display interface 51 that may be communicatively coupled with the processor 56 and/or memory 58 for communicating with the display device 105 via display ports 53 and 55. Display ports 53 and 55 may include various types of ports including, but not limited to, high definition multimedia interface (HDMI) ports, display serial interface (DSI) ports, mobile industry processor interface (MIPI) DSI ports, universal serial bus (USB) ports, Firewire ports, or other embedded or external wired or wireless display ports that can allow communications, for example, via network between computer device 102 and display device 105. Display device 105, as noted above, may include a display panel 52 such as optical components that present virtual environment 54 to the user.

Figure 1D:
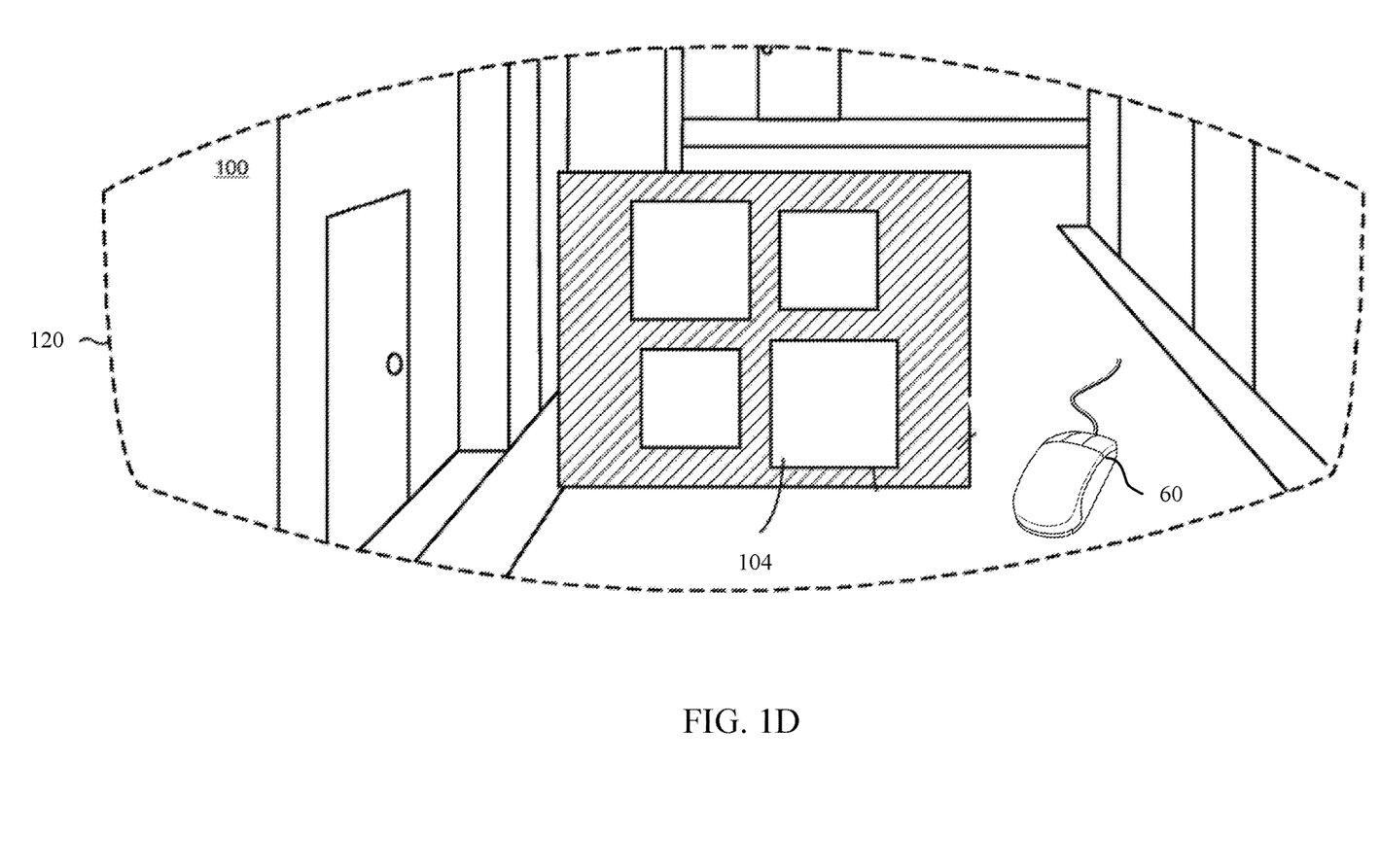
FIG. 1D is an example of a field of view of a HMD that the user sees on the display of the HMD in accordance with an implementation of the present disclosure.

As shown in FIG. 1B, the physical, real world space that the user occupies when using the HMD device 105 can contain various real world objects including the computer device 102, monitor 104, and work surface 106. Other real world objects may also be present in the space. The user may interact with the computer device 102 and display device 105 using a mouse 60 and other user interfaces (not shown in FIG. 1B) such as keyboards, voice, and gestures in some cases. In this particular illustrative example, the monitor content is incorporated into a VR/MR reality environment 120, as shown in FIG. 1D, and may be visible to the user on the HMD device 105.

The user 103 can typically interact with the computer device 102 when viewing the monitor 104 in the VR/MR environment in substantially the same way as in the real world environment. For example, the user 103 can interact with objects, elements, windows, etc. that are supported on the application 14 of the computer device 102 using a mouse cursor that is displayed on the monitor 104.

As noted above, because in VR, actual reality is completely replaced by the virtual world, locating and interacting with the physical devices (e.g., traditional mouse 60) without any visual affordance makes use of such devices generally impractical, limits productivity, breaks immersion, and may cause poor user experience. Features of the present disclosure address the above-identified problem by implementing techniques that modify traditional input devices (e.g., traditional computer mouse 60 form factor) to interact with the VR devices. Such modification allows the VR devices the ability to track the position and orientation of the mouse in the 3D VR environment without requiring extensive complex hardware generally included in VR motion controllers. Indeed, tracking a traditional mouse in 3D allows the user 103 to visualize the model of the mouse 60

(see FIG. 1D) at its physical location within the VR environment. As such, based on the detection and tracking of the mouse 610 in the VR scene, the user 103 may easily locate the mouse 60 (or relocate the mouse 610 in instances that the user moves his or her hand away from the mouse 610) in the VR scene in order to use the mouse 610 as an input device for VR devices.

Figure 2A:
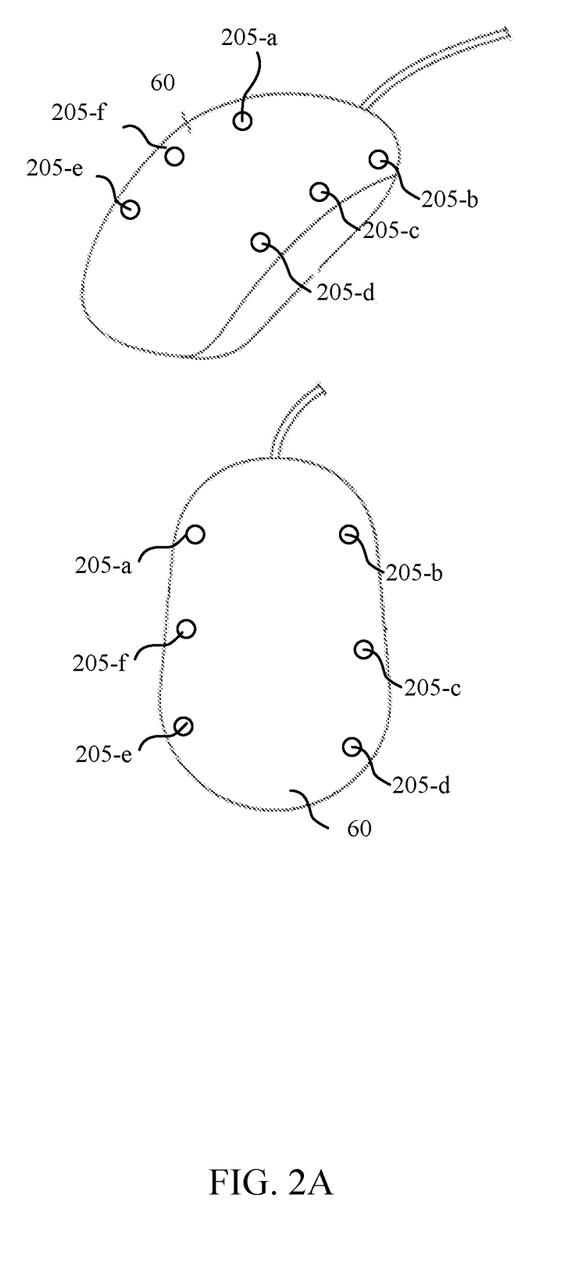
FIG. 2A is a schematic diagram of one example input device including markers for detection in accordance with an implementation of the present disclosure.

Turning next to FIG. 2A, to facilitate detection and tracking of the input device 60 so that input device 60 may be visible to the HMD 105 in its field of view (FOV) 120, the input device 60 (e.g., mouse form factor) may be merged with one or more 3D constellations based tracking elements (e.g., LEDs) with minimal form-factor modifications. It should be appreciated that the terms "mouse" and "input device" are used interchangeably for purposes of this application. The constellation tracking elements may include a plurality of fiducial markers 205 on the mouse 60 that may be detected by an imaging sensor (e.g., bright point light source) of the HMD 105, and thus allow tracking with one or more imaging sensors (e.g., either head-mounted or fixed position).

Figure 2B:
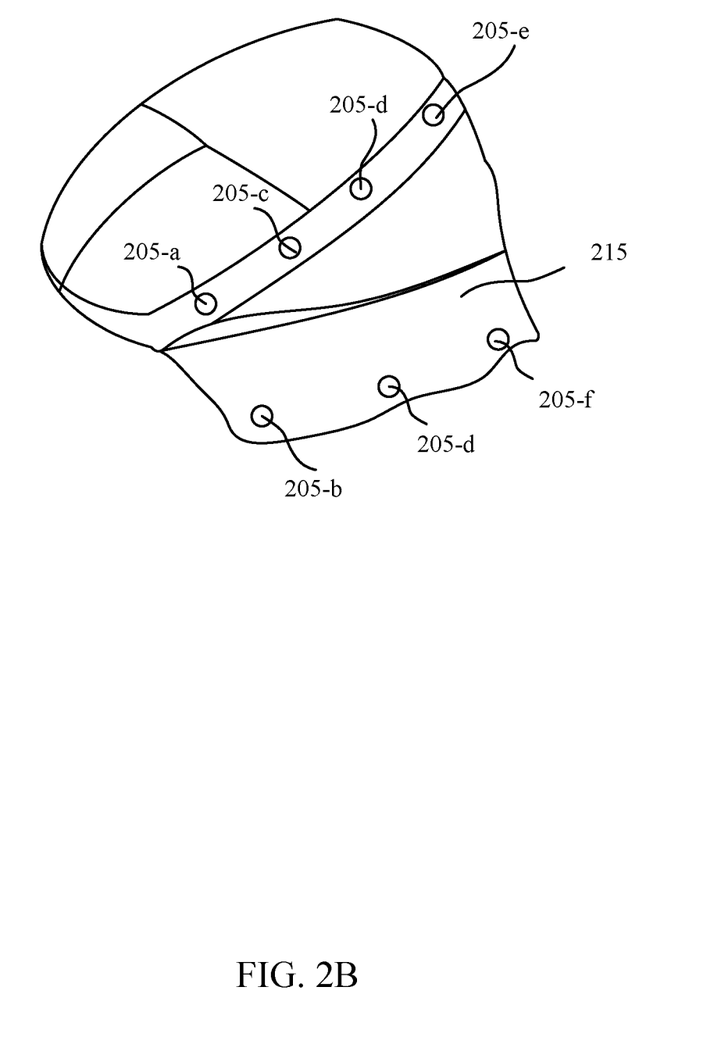
FIG. 2B is a schematic diagram of another example of fiducial markers position in accordance with an implementation of the present disclosure.

The positioning and the quantity of the fiducial markers 205 on the input device 60 may be such that there are at least one or more fiducial markers 205 that remain exposed and visible even with the hand of the user covers the input device 60. In some examples, where the mouse is configured with a thumb rest 215, as in FIG. 2B, the one or more fiducial markers 205 may be positioned on the thumb rest 216 and additional fiducial markers 205 on the surface of the computer mouse 60 such that with the placement of the hand, at least one or more fiducial markers 205 remains exposed to be detected by the HMD 105. In some examples, the fiducial markers 205 may be detected by an imaging sensor based on the profile and the pattern of the fiducial markers 205 that are detected by the HMD 105. Because the fiducial markers 205 are exposed and have a predetermined profile (e.g., positioning of the markers), the HMD 105 may detect and track the tracking elements (e.g., LEDs) such that the user 103 may more easily locate the mouse 60 or relocate the mouse 60 in the VR environment when the mouse 60 is in FOV of the HMD 105. In some examples, the input device 60 may further be configured with IMU for improved sensor fusion.

In some examples, the fiducial markers 205 are embedded in the surface of the mouse 60. The LEDs may also be placed on the top surface of the mouse 60, as illustrated in FIG. 2, such that when the mouse 60 is resting upright on a desk surface, at least one or more fiducial markers 205 remain exposed and can be detected by the HMD 105. In some instances, the area between the thumb and the index finger may be used for the placement of fiducial markers 205. By detecting the one or more fiducial markers 205, the HMD 105 may be able to identify and project the location of the mouse 60 within the VR environment (see FIG. 1D). In some instances, the minimum number of fiducial markers 205 may be three such that any three markers that may be visible while the mouse 60 is in use form a triangle such that position and orientation of the mouse 60 may be determined in the virtual reality environment. As such, even when the user 103 is fully immersed in the VR environment, the user 103 may be able to locate the mouse 60 and grab the mouse 60 without the need to remove the HMD 105. Further, because the mouse 60 that is used for interaction in the VR environment is a traditional input device (as opposed to specialized VR motion controller), the input device 60 is not limited to a single use applications (e.g., VR), but may also be used outside VR environment.

Figure 3:
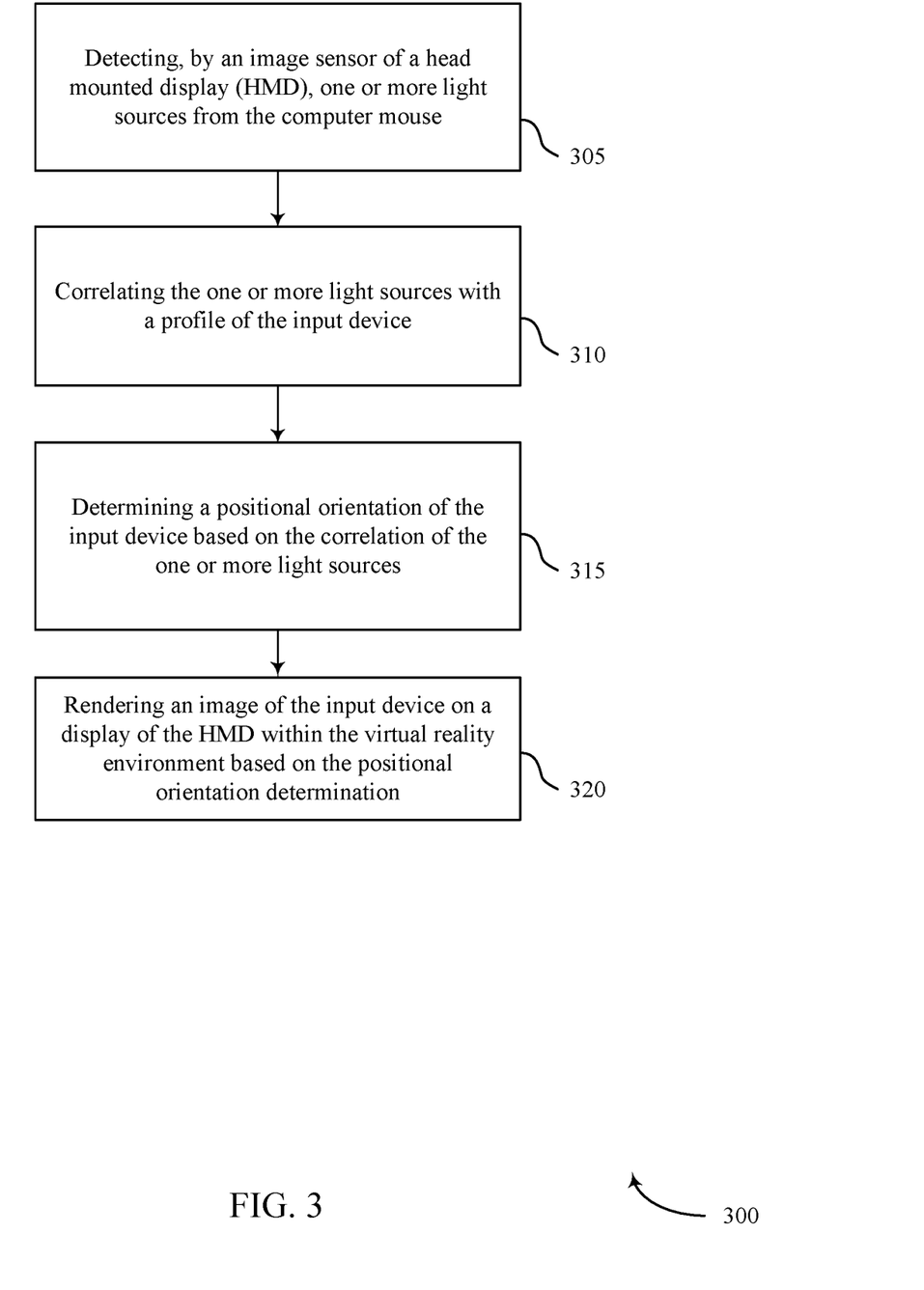
FIG. 3 is a flowchart of an example method for tracking an input device in a virtual reality environment in accordance with an implementation of the present disclosure.

Referring now to FIG. 3, illustrated is a method 300 that may be used by computer device 102 (FIG. 1) and/or the display device 105 (FIG. 1) to process image frames using compositor 28 (FIG. 1) and implement the use of the mouse 60 as an input device for VR environment. Specifically, the method 300 may be used for detecting and tracking a input device 60 in a VR environment.

At 305, method 300 may include detecting, by an image sensor of a HMD 105, one or more light sources 205 from the computer mouse. In some examples, the computer mouse may include a plurality of fiducial markers positioned on one or more surfaces (or embedded) of the input device that emit light. The fiducial markers may be positioned such that at least a subset (e.g., three fiducial markers) of a complete set of fiducial markers (e.g., six fiducial markers) may remain exposed when a user covers the input device with a hand (or any other limb or body part). Aspects of block 305 may be performed by an imaging sensor 68 described with reference to FIG. 4. It should be appreciated that the imaging sensor 68 may be part of the computer device 102, the HMD 105, or a separate standalone system.

At 310, method 300 may include correlating the one or more light sources with a profile of the computer mouse. Correlating the one or more light sources with the profile may include matching the detected light sources with the known position of the fiducial markers on the input device. In some examples, the one or more profiles may be stored in a database as different combinations such that imaging sensor may recognize the position and orientation of the input device 60 based on a plurality of possible combinations that may be associated with the detected light. Aspects of block 310 may also be performed by an imaging sensor 68 described with reference to FIG. 4.

At 315, method 300 may include determining a position and orientation of the computer mouse 60 based on the correlation of the one or more light sources. In other examples, the position and orientation may be such that the location of the input device in physical environment corresponds to the projected image of the mouse in the virtual environment. In some examples, once the positional orientation of the input device 60 is identified, the HMD 105 may continue to track the input device on the display of the HMD 105 within the VR environment by tracking the one or more light sources as the profile of the input device. Aspects of block 315 may also be performed by an imaging sensor 68 described with reference to FIG. 4.

At 320, method 300 may include rendering an image of the computer mouse 60 on a display of the HMD 105 within the VR environment based on the position and orientation determination. In some examples, projecting the image of the input device 60 may include projecting or display a likeness of a mouse in the virtual reality. In some examples, the input device 60 may be a mouse (or another input device) and may exclude hardware components such as IMU that are generally included in motion controllers. Aspects of block 320 may be performed by an display controller 50 described with reference to FIG. 4.

Figure 4:
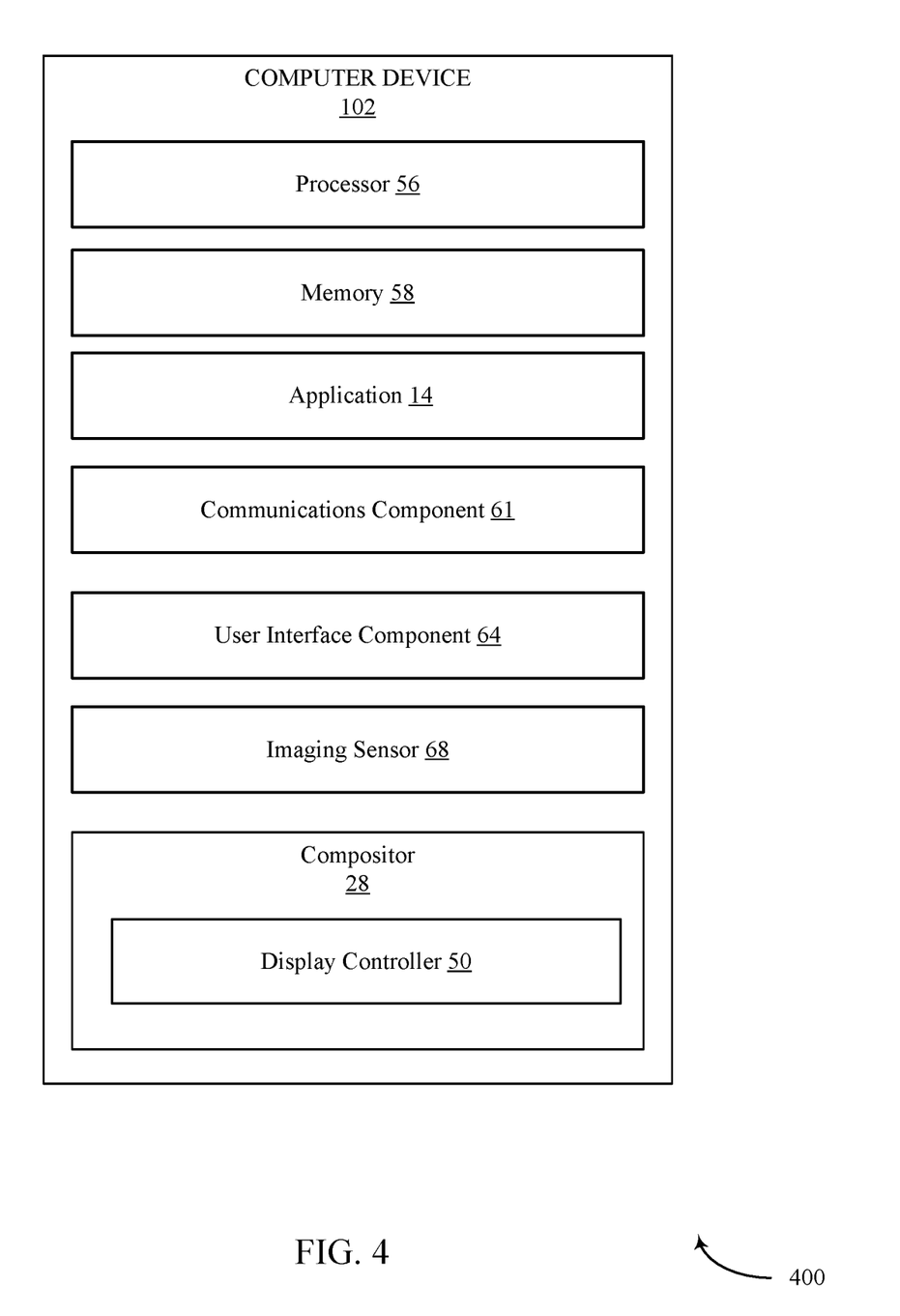
FIG. 4 is a schematic block diagram of an example device in accordance with an implementation of the present disclosure.

Referring now to FIG. 4, illustrated is an example computer device 102 in accordance with an implementation, including additional component details as compared to FIG. 1. As noted above, in some examples, components illustrated as part of the computer device 102 may also be implemented directly within the display device 105. In such situations, the term "computer device" may also refer to stand alone display device(s) 105 such as HMD devices, smart phones, or tablet. In one example, computer device 102 may include processor 56 for carrying out processing functions associated with one or more of components and functions described herein. Processor 56 can include a single or multiple set of processors or multi-core processors. Moreover, processor 56 can be implemented as an integrated processing system and/or a distributed processing system.

Computer device 102 may further include memory 58, such as for storing local versions of applications being executed by processor 56. Memory 58 can include a type of memory usable by a computer, such as random access memory (RAM), read only memory (ROM), tapes, magnetic discs, optical discs, volatile memory, non-volatile memory, and any combination thereof. Additionally, processor 56 and memory 58 may include and execute operating system 106 (FIG. 1).

Further, computer device 102 may include a communications component 61 that provides for establishing and maintaining communications with one or more parties utilizing hardware, software, and services as described herein. Communications component 61 may carry communications between components on computer device 102, as well as between computer device 102 and external devices, such as devices located across a communications network and/or devices serially or locally connected to computer device 102. For example, communications component 61 may include one or more buses, and may further include transmit chain components and receive chain components associated with a transmitter and receiver, respectively, operable for interfacing with external devices.

Computer device 102 may also include a user interface component 64 operable to receive inputs from a user of computer device 102 and further operable to generate outputs for presentation to the user. User interface component 64 may include one or more input devices, including but not limited to a mouse, keyboard, a number pad, a touch-sensitive display, a navigation key, a function key, a microphone, a voice recognition component, any other mechanism capable of receiving an input from a user, or any combination thereof. Further, user interface component 64 may include one or more output devices, including but not limited to a display, a speaker, a haptic feedback mechanism, a printer, any other mechanism capable of presenting an output to a user, or any combination thereof. In an implementation, user interface component 64 may transmit and/or receive messages corresponding to the operation of applications 14, compositor 28, display controller 50, and/or display interface 51. The computer device 102 may also include a compositor 28 that utilizes the display controller 50 to process one or more image frames to be displayed on the display device 105.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or" That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. The computer-readable medium (also referred to as computer-readable media) includes a computer storage medium which may be referred to as non-transitory computer-readable medium. A non-transitory computer-readable medium may exclude transitory signals. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where discs usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method for tracking a computer mouse in a virtual reality environment, comprising:
    detecting, by an image sensor of a head mounted display (HMD), one or more light sources from the computer mouse;
    correlating the one or more light sources with a profile of the computer mouse by matching the detected one or more light sources with known positions of the one or more light sources;
    determining a position and orientation of the computer mouse based on the correlation of the one or more light sources; and
    rendering an image of the computer mouse on a display of the HMD within the virtual reality environment based on the position and orientation determination,
    wherein correlating the one or more light sources with the profile of the computer mouse comprises:
    determining whether an orientation of the one or more light sources corresponds to at least one of a plurality of profiles stored in a database for the computer mouse; and
    identifying the profile from the plurality of profiles based on the orientation of the computer mouse.

2. The method of claim 1, wherein the one or more light sources are a plurality of fiducial markers on surface of the computer mouse that emit light.

3. The method of claim 2, wherein the fiducial markers are positioned such that at least a subset of a complete set of fiducial markers remain exposed when a user covers the computer mouse with a hand.

4. The method of claim 1, further comprising:
    tracking a movement of the computer mouse on the display of the HMD with the virtual reality environment by tracking the one or more light sources.

5. The method of claim 1, wherein determining the position and orientation of the computer mouse comprises:
    locating the computer mouse in physical environment; and
    associating a projected image of the computer mouse in physical environment with a location in the virtual environment.

6. The method of claim 1, wherein the computer mouse excludes inertial measurement units (IMUs).

7. A computer device for tracking computer mouse in a virtual reality environment, comprising:
    a memory to store data and instructions; and
    a processor in communication with the memory to execute the instructions to:
    detect, by an image sensor of a head mounted display (HMD), one or more light sources from the computer mouse;
    correlate the one or more light sources with a profile of the computer mouse by matching the detected one or more light sources with known positions of the one or more light sources;
    determine a position and orientation of the computer mouse based on the correlation of the one or more light sources; and
    render an image of the computer mouse on a display of the HMD within the virtual reality environment based on the position and orientation determination,
    wherein the instructions to correlate the one or more light sources with the profile of the computer mouse further include instructions to:
    determine whether an orientation of the one or more light sources corresponds to at least one of a plurality of profiles stored in a database for the computer mouse; and
    identify the profile from the plurality of profiles based on the orientation of the computer mouse.

8. The computer device of claim 7, wherein the computer includes one or more light sources are a plurality of fiducial markers on surface of the computer mouse that emit light.

9. The computer device of claim 8, wherein the fiducial markers are positioned such that at least a subset of a complete set of fiducial markers remain exposed when a user covers the computer mouse with a hand.

10. The computer device of claim 7, wherein the instructions are further executable to:
    track a movement the computer mouse on the display of the HMD with the virtual reality environment by tracking the one or more light sources as the profile of the computer mouse.

11. The computer device of claim 7, wherein the instructions are further executable to:
    locate the computer mouse in physical environment; and
    associate a projected image of the computer mouse in physical environment with a location in the virtual environment.

12. The computer device of claim 7, wherein the computer mouse excludes inertial measurement units (IMUs).

13. A non-transitory computer-readable medium storage device storing instructions executable by a computer device for tracking an computer mouse in a virtual reality environment, the instructions comprising code for:
    detecting, by an image sensor of a head mounted display (HMD), one or more light sources from the computer mouse;

correlating the one or more light sources with a profile of the computer mouse by matching the detected one or more light sources with known positions of the one or more light sources;

determining a position and orientation of the computer mouse based on the correlation of the one or more light sources; and rendering an image of the computer mouse on a display of the HMD within the virtual reality environment based on the position and orientation determination, wherein the code for correlating the one or more light sources with the profile of the computer mouse further comprises code for:

determine whether an orientation of the one or more light sources corresponds to at least one of a plurality of profiles stored in a database for the computer mouse; and identify the profile from the plurality of profiles based on the orientation of the computer mouse.

14. The non-transitory computer-readable medium storage device of claim 13, wherein the one or more light sources are a plurality of fiducial markers on surface of the computer mouse that emit light.

15. The non-transitory computer-readable medium storage device of claim 14, wherein the fiducial markers are positioned such that at least a subset of a complete set of fiducial markers remain exposed when a user covers the computer mouse with a hand.

16. The non-transitory computer-readable medium storage device of claim 13, further comprising code for:

tracking a movement of the computer mouse on the display of the HMD with the virtual reality environment by tracking the one or more light sources as the profile of the computer mouse.

17. The non-transitory computer-readable medium device of claim 13, wherein the computer mouse excludes inertial measurement units (IMUs).

* * * * *